(12) United States Patent
Martin et al.

(10) Patent No.: US 12,554,551 B2
(45) Date of Patent: *Feb. 17, 2026

(54) SYSTEMS, METHODS, AND APPARATUS FOR ASSOCIATING COMPUTATIONAL DEVICE FUNCTIONS WITH COMPUTE ENGINES

(71) Applicant: Samsung Electronics Co., Ltd., Suwon-si (KR)

(72) Inventors: William Martin, Roseville, CA (US); Oscar P. Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,519

(22) Filed: May 20, 2024

(65) Prior Publication Data

US 2024/0354166 A1 Oct. 24, 2024

Related U.S. Application Data

(63) Continuation of application No. 17/730,182, filed on Apr. 26, 2022, now Pat. No. 11,989,594.
(Continued)

(51) Int. Cl.
*G06F 9/30* (2018.01)
*G06F 9/38* (2018.01)
*G06F 9/50* (2006.01)

(52) U.S. Cl.
CPC ........ *G06F 9/5066* (2013.01); *G06F 9/30003* (2013.01); *G06F 9/3877* (2013.01); *G06F 9/50* (2013.01); *G06F 9/5027* (2013.01)

(58) Field of Classification Search
CPC .. G06F 9/5066; G06F 9/30003; G06F 9/3877; G06F 9/50; G06F 9/5027; G06F 9/3802; G06F 9/3851
See application file for complete search history.

(56) References Cited

U.S. PATENT DOCUMENTS 7,287,254 B2 10/2007 Miller et al.
9,294,567 B2 3/2016 Hussain et al.
(Continued)

FOREIGN PATENT DOCUMENTS

JP 2020047277 A 3/2020
TW 201805821 A 2/2018

OTHER PUBLICATIONS

European Extended Search Report for Application No. 22187414.2, mailed Dec. 16, 2022.
(Continued)

*Primary Examiner* — Corey S Faherty
(74) *Attorney, Agent, or Firm* — Renaissance IP Law Group LLP

(57) ABSTRACT

A method may include creating an association identifier based on an association between a computational device function and a compute engine of a computational device, and invoking an execute command to perform an execution of the computational device function using the compute engine, wherein the execute command uses the association identifier. The compute engine may be a first compute engine, and the association may be further between the computational device function and a second compute engine of the computational device. The execute command may perform an execution of the computational device function using the second compute engine. The execution of the computational device function using the first compute engine and the execution of the computational device function using the second compute engine may overlap. The execute command may include the association identifier. The creating the association identifier may include invoking a create association command.

19 Claims, 7 Drawing Sheets

Related U.S. Application Data

(60) Provisional application No. 63/319,767, filed on Mar. 14, 2022, provisional application No. 63/229,071, filed on Aug. 3, 2021.

(56) References Cited

U.S. PATENT DOCUMENTS

| | | | |
|---|---|---|---|
| 9,565,269 | B2 | 2/2017 | Malwankar et al. |
| 9,712,619 | B2 | 7/2017 | Malwankar et al. |
| 10,977,199 | B2 | 4/2021 | Suri et al. |
| 2011/0078652 | A1* | 3/2011 | Mani .............. G06F 8/10 717/105 |
| 2012/0079501 | A1 | 3/2012 | Sandstrom |
| 2017/0147411 | A1* | 5/2017 | Kobori ............ G06T 1/20 |
| 2019/0243687 | A1* | 8/2019 | Chen ........... G06F 11/3433 |
| 2019/0250852 | A1 | 8/2019 | Kabra et al. |
| 2019/0324803 | A1* | 10/2019 | Achouche ............ G06F 9/54 |
| 2020/0136996 | A1 | 4/2020 | Li et al. |
| 2020/0219223 | A1* | 7/2020 | Vembu ................ G06T 1/60 |

OTHER PUBLICATIONS

Final Office Action for U.S. Appl. No. 17/730,182, mailed Aug. 4, 2023.
Notice of Allowance for U.S. Appl. No. 17/730,182, mailed Jan. 18, 2024.
NVM Express, Inc. "NVM Express Base Specification Revision 1.4," Jun. 10, 2019, 403 pages.
NVM Express, Inc. "NVM Express Base Specification Revision 1.4a," 2020, 400 pages.
Office Action for U.S. Appl. No. 17/730,182, mailed Mar. 17, 2023.
European Office Action for Application No. 22187414.2, mailed Jul. 23, 2025.

* cited by examiner

Create Association Command (NOCE ≤ 12)

| bits | 31 – 24 | 23 – 16 | 15 – 14 | 14 – 10 | 9 – 8 | 7 – 0 |
|---|---|---|---|---|---|---|
| CDW0 | Command Identifier (CID) | | PSDT | Res | FUSE | Opcode (OPC) |
| CDW1 | Namespace Identifier (NSID) ||||||
| CDW2 | Number of Compute Engines (NOCE) ||| Function Slot (FS) |||
| CDW3 | ||||||
| CDW4 | ||||||
| CDW5 | ||||||
| CDW6 | ||||||
| CDW7 | ||||||
| CDW8 | ||||||
| CDW9 | ||||||
| CDW10 | Compute Engine ID List (CEIDL) ||||||
| CDW11 | ||||||
| CDW12 | ||||||
| CDW13 | ||||||
| CDW14 | ||||||
| CDW15 | ||||||

Create Association Command (NOCE > 12)

| bits | 31 – 24 | 23 – 16 | 15 – 14 | 14 – 10 | 9 – 8 | 7 – 0 |
|---|---|---|---|---|---|---|
| CDW0 | Command Identifier (CID) | | PSDT | Res | FUSE | Opcode (OPC) |
| CDW1 | Namespace Identifier (NSID) ||||||
| CDW2 | Number of Compute Engines (NOCE) ||| Function Slot (FS) |||
| CDW3 | ||||||
| CDW4 | ||||||
| CDW5 | ||||||
| CDW6 | DPTR ||||||
| CDW7 | ||||||
| CDW8 | ||||||
| CDW9 | ||||||
| CDW10 | ||||||
| CDW11 | ||||||
| CDW12 | ||||||
| CDW13 | ||||||
| CDW14 | ||||||
| CDW15 | ||||||

Delete Association Command

| | 31 24 | 23 16 | 15 14 | 13 10 | 9 8 | 7 0 bit |
|---|---|---|---|---|---|---|
| CDW0 | Command Identifier (CID) | | PSDT | Res | FUSE | Opcode (OPC) |
| CDW1 | Namespace Identifier (NSID) ||||||
| CDW2 | ||||||
| CDW3 | ||||||
| CDW4 | ||||||
| CDW5 | ||||||
| CDW6 | ||||||
| CDW7 | ||||||
| CDW8 | ||||||
| CDW9 | ||||||
| CDW10 | Reserved ||| Function Association Identifier (FAI) |||
| CDW11 | ||||||
| CDW12 | ||||||
| CDW13 | ||||||
| CDW14 | ||||||
| CDW15 | ||||||

Execute Function Command

| | 31 24 | 23 16 | 15 14 | 13 10 | 9 8 | 7 0 bit |
|---|---|---|---|---|---|---|
| CDW0 | Command Identifier (CID) | | PSDT | Res | FUSE | Opcode (OPC) |
| CDW1 | Namespace Identifier (NSID) ||||||
| CDW2 | Reserved | FOA | NOFA || Function Association ID (FAI) ||
| CDW3 | ||||||
| CDW4 | ||||||
| CDW5 | ||||||
| CDW6 | DPTR ||||||
| CDW7 | ||||||
| CDW8 | ||||||
| CDW9 | ||||||
| CDW10 | PARAMD ||||||
| CDW11 | ||||||
| CDW12 | ||||||
| CDW13 | ||||||
| CDW14 | ||||||
| CDW15 | ||||||

SYSTEMS, METHODS, AND APPARATUS FOR ASSOCIATING COMPUTATIONAL DEVICE FUNCTIONS WITH COMPUTE ENGINES

REFERENCE TO RELATED APPLICATIONS

This application is a continuation of U.S. patent application Ser. No. 17/730,182 filed Apr. 26, 2022, now allowed, which claims priority to, and the benefit of, U.S. Provisional Patent Application Ser. No. 63/319,767 filed Mar. 14, 2022, and U.S. Provisional Patent Application Ser. No. 63/229,071, filed Aug. 3, 2021, all of which are incorporated by reference in their entirety.

TECHNICAL FIELD

This disclosure relates generally to computational devices, and more specifically to systems, methods, and apparatus for associating computational device functions with compute engines.

BACKGROUND

A computational device such as an accelerator or a computational storage device may implement one or more functions that may perform operations on data. A host may offload a processing task to the computational device by invoking a function that may be implemented by the device. The computational device may perform the function, for example, using one or more compute resources.

The above information disclosed in this Background section is only for enhancement of understanding of the background of the inventive principles and therefore it may contain information that does not constitute prior art.

SUMMARY

A method may include creating an association identifier based on an association between a computational device function and a compute engine of a computational device, and invoking an execute command to perform an execution of the computational device function using the compute engine, wherein the execute command uses the association identifier. The compute engine may be a first compute engine, and the association may be further between the computational device function and a second compute engine of the computational device. The execute command may perform an execution of the computational device function using the second compute engine. The execution of the computational device function using the first compute engine and the execution of the computational device function using the second compute engine may overlap. The execute command may include the association identifier. The creating the association identifier may include invoking a create association command. The method may further include returning, based on the create association command, the association identifier. The create association command may include first information to identify the computational device function and second information to identify one or more compute engines. The first information may include an identifier for the computational device function. The identifier for the computational device function may identify a function slot at the computational device. The second information may include one or more identifiers for one or more compute engines of the computational device. The second information may include a pointer to one or more identifiers for one or more compute engines of the computational device. The method may further include modifying the association. The modifying the association may include invoking a modify association command. The modify association command may use the association identifier. The method may further include providing information about one or more compute engines of the computational device. The providing may include returning, based on a request command, the information about one or more compute engines of the computational device. The information about one or more compute engines may include one or more of a number of engines, one or more identifiers for one or more compute engines, or one or more capabilities of one or more compute engines.

A method may include performing a first execution of a computational device function using a first compute engine of a computational device, and performing a second execution of the computational device function using a second compute engine of the computational device, wherein the first execution and the second execution overlap. The first execution may include a first thread of the computational device function, and the second execution may include a second thread of the computational device function. The method may further include creating an association identifier based on an association between the computational device function, the first compute engine, and the second compute engine. The first execution and the second execution may be based on an execute command, and the execute command may be based on the association identifier. The creating the association identifier may include invoking a create association command. The create association command may include first information to identify the computational device function and second information to identify the first compute engine and the second compute engine.

A device may include a compute engine configured to execute a computational device function, and at least one processor configured to create an association identifier based on an association between the computational device function and the compute engine, and invoke an execute command, using the association identifier, to perform an execution of the computational device function using the compute engine. The compute engine may be a first compute engine, the device further may include a second compute engine, and the association may be further between the computational device function and the second compute engine. The execute command may perform an execution of the computational device function using the second compute engine. The execution of the computational device function using the first compute engine and the execution of the computational device function using the second compute engine may overlap. The at least one processor may be configured to receive a create association command, and create, based on the create association command, the association identifier. The at least one processor may be configured to return the association identifier based on the create association command. The at least one processor may be configured to receive a modify association command, and modify, based on the modify association command, the association identifier. The at least one processor may be configured to provide information about one or more compute engines of the computational device. The at least one processor may be configured to provide the information about the one or more compute engines based on a request command. The information about the one or more compute engines may include one or more of a number of compute engines, one or more identifiers for the one or more compute engines, or one or more capabilities of the one or more compute engines.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 5 illustrates another embodiment of a create association command in accordance with example embodiments of the disclosure.

FIG. 6 illustrates another embodiment of a create association command in accordance with example embodiments of the disclosure.

FIG. 7 illustrates an embodiment of a delete association command in accordance with example embodiments of the disclosure.

FIG. 8 illustrates an embodiment of an execute function command in accordance with example embodiments of the disclosure.

DETAILED DESCRIPTION

Figure 1:
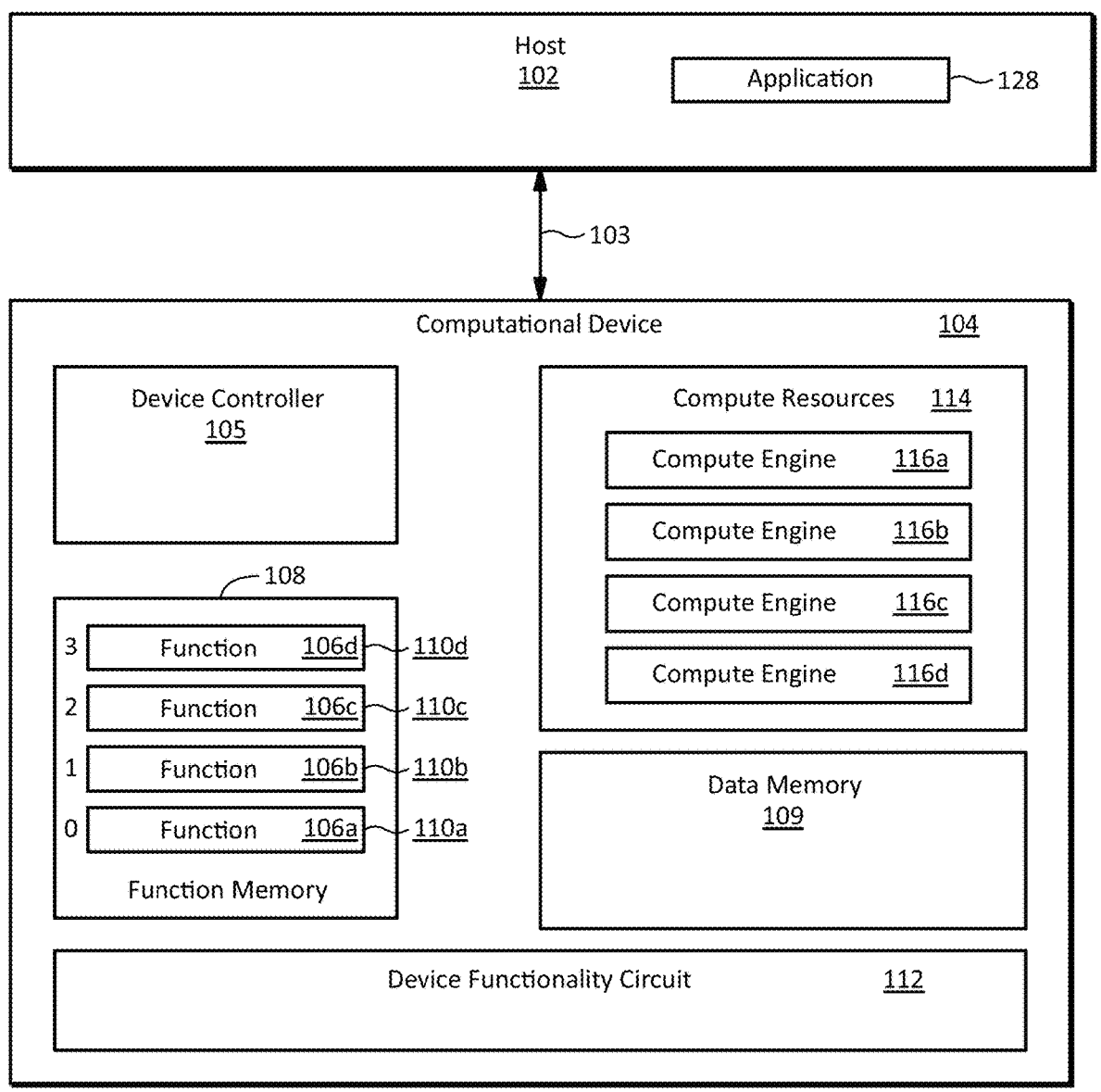
FIG. 1 illustrates an embodiment of a scheme for implementing one or more computational device functions with one or more compute engines at a computational device in accordance with example embodiments of the disclosure.

Computational devices such as accelerators, computational storage devices, and/or the like, may include one or more compute engines that may be configured to execute one or more computational device functions that may be used, for example, to offload processing tasks from a host. A computational device may implement a pairing scheme to pair a computational device function with a compute engine at the device. However, the scheme may not enable a computational device function to be paired with more than one compute engine. Depending on the implementation details, this may prevent the pairing scheme from scaling to use a computational device function with more than one compute engine, for example, to execute a multi-threaded function. Moreover, depending on the implementation details, the pairing scheme may be difficult to implement.

An association scheme for computational device functions and compute engines in accordance with example embodiments of the disclosure may enable a computational device function to be associated with one or more compute engines. For example, in some embodiments, an association scheme may implement an association identifier that may be used to identify an association between a computational device function (which may also be referred to as a function) and one or more compute engines that may execute the function. The association identifier may be used, for example, by an execute command to identify a function to execute and one or more compute engines to use to execute the function. Depending on the implementation details, more than one compute engine may execute the function simultaneously, for example, if the function is a multi-threaded function.

In some embodiments, an association scheme may implement one or more commands to manage and/or use association identifiers. For example, a create association command may create an association of a function with one or more compute engines based on one or more inputs such as a function identifier and one or more compute engine identifiers. The create association command may return an association identifier that identifies an association between one or more functions and one or more compute engines, a status of the command, and/or the like.

As another example, a modify association command may modify (e.g., delete) an association previously created by a create association command. For example, a delete association command may delete an association based on an input such as an association identifier. The modify association command may return one or more status values, for example, indicating success or failure.

As a further example, an association scheme may implement a discovery feature that may enable a computational device to advertise one or more compute engines, capabilities, and/or the like. For example, in response to a request command (e.g., a get log command), a computational device may return information such as a number of compute engines and/or engine types available at the device, a list of identifiers, capabilities, and/or the like of the compute engines, and/or the like.

Depending on the implementation details, an association scheme for computational device functions and compute engines in accordance with example embodiments of the disclosure may provide one or more benefits, for example, the ability to scale an association scheme for use with multi-threaded computational functions, the ability to integrate into an existing computational device architecture, command structure, and/or the like, the simplification of namespace management, and/or the like.

For purposes of illustration, some embodiments may be described in the context of computational storage devices and/or devices that may implement a Nonvolatile Memory Express (NVMe) protocol. However, the principles are not limited to use with storage devices or an NVMe protocol, and may be applied to any computational devices that may implement one or more computational device functions with one or more compute engines and any communication protocol.

FIG. 1 illustrates an embodiment of a scheme for implementing one or more computational device functions with one or more compute engines at a computational device in accordance with example embodiments of the disclosure. The embodiment illustrated in FIG. 1 may include a host 102, and a computational device 104 connected by a communication fabric 103. In some embodiments, the host 102 may offload one or more tasks to one or more computational device functions implemented by the computational device 104.

The computational device 104 may include a device controller 105, a function memory area 108, a data memory 109, one or more compute resources 114, and/or a device functionality circuit 112. The device controller 105 may control the overall operation of the computational device 104. For example, in some embodiments, the device controller 105 may parse, process, invoke, and/or the like, commands received from the host 102. The device functionality circuit 112 may include any hardware to implement the primary function of the computational device 104. For example, if the computational device 104 is implemented as a storage device, the device functionality circuit 112 may include a storage medium such as one or more flash memory devices, a flash translation layer (FTL), and/or the like. In some embodiments, a computational storage device may be implemented as a computational storage drive (CSD), a computational storage processor (CSP), and/or a computational storage array (CSA).

As another example, if the computational device 104 is implemented as a network interface card (NIC), the device functionality circuit 112 may include one or more modems, network interfaces, physical layers (PHYs), medium access control layers (MACs), and/or the like. As a further example, if the computational device 104 is implemented as an accelerator, the device functionality circuit 112 may include one or more compute resources such as field programmable gate arrays (FPGAs), application specific integrated circuits (ASICs), embedded processors, and/or the like.

The host 102 may be implemented with any component or combination of components that may utilize the computational resources 114 of the computational device 104. For example, the host 102 may include to one or more of a client device, a server, a storage node, a central processing unit (CPU), a personal computer, a tablet computer, a smartphone, and/or the like. Moreover, the embodiment illustrated in FIG. 1 may include any number of hosts.

The communication fabric 103 may be implemented with one or more interconnects, one or more networks, a network of networks (e.g., the internet), and/or the like, or a combination thereof, using any type of interface and/or protocol. For example, the fabric 103 may be implemented with Peripheral Component Interconnect Express (PCIe), Non-volatile Memory Express (NVMe), NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI). Serial Attached SCSI (SAS), iWARP, and/or the like, or any combination thereof. For example, in an embodiment in which the computational device 104 is implemented as a storage device, the controller 105 may implement a storage protocol such as NVMe that may enable the host 102 and the computational device 104 to exchange commands, data, and/or the like, over the communication fabric 103. In some embodiments, the communication fabric 103 may include one or more switches, hubs, nodes, routers, and/or the like.

The memory area 108 may include one or more function slots 110 (in this example, four function slots 110a-110d) for storing one or more executable computational device functions 106 (in this example, functions 106a-106d). The one or more computational device functions 106 (e.g., software implemented functions) may be executed, for example, using one or more compute engines 116 (in this example, compute engines 116a-116d) in the computational resources 114. In some embodiments, the data memory 109 may be used by one or more of the computational device functions 106 when being executed with one or more of the compute engines 116. For example, the data memory 109 may be used to hold input data, output data, transitional data, and/or the like, for one or more of the computational device functions 106.

In some embodiments, one or more of the compute engines 116 may include one or more processing resources such as embedded processors (e.g., CPUs such as complex instruction set computer (CISC) processors such as x86 processors and/or reduced instruction set computer (RISC) processors such as ARM processors), ASICs, FPGAs, graphics processing units (GPUs), neural processing units (NPUs), tensor processing units (TPUs), and/or the like, executing instructions that may execute one or more of the computational device functions 106. In some embodiments, one or more of the compute engines 116 may execute one or more of the executable computational device functions 106 in an execution environment such as a container, a virtual machine, an operating system such as Linux, an Extended Berkeley Packet Filter (eBPF) environment, and/or the like, or a combination thereof.

In some embodiments, one or more of the compute engines may provide full or partial (e.g., hybrid) hardware implementations of one or more of the computational device functions 106 (in this example, computational device functions 106a and 106b). For example, in some embodiments, one or more of the compute engines 116 may include combinational logic, sequential logic, one or more timers, counters, registers, and/or state machines, one or more complex programmable logic devices (CPLDs). FPGAs, ASICs, and/or a combination thereof configured to process a bitstream for a computational device function 106 that may be implemented, for example, as a soft FPGA function.

In some embodiments, one or more of the computational device functions 106 may be downloaded, for example, from the host 102 and/or any other source. In some embodiments, one or more of the computational device functions 106 may be loaded into the device 104 when is it manufactured, shipped, installed, updated, and/or upgraded (e.g., through a firmware updated and/or upgrade) and/or the like. In some embodiments, a function may be referred to as a program, for example, in the context of executable computational device functions 106 that may be downloaded.

In some embodiments, the host 102 may run one or more applications 128 that may utilize the computational device functions 106 and/or compute engines 116 of the computational device 104 using, for example, an association scheme as disclosed herein.

In some embodiments, a computational device function may refer to any type of function that may be performed by one or more compute resources of a computational device such as an algorithm, data movement, data management, data selection, filtering, encryption and/or decryption, compression and/or decompression, checksum calculation, hash value calculation, cyclic redundancy check (CRC), and/or the like. In some embodiments, a computational device function may refer to a function that may be intended to be executed by a computational device, adapted to be executed by a computational device, and/or the like. In some embodiments, a compute engine may refer to a component or combination of components that may be capable of executing one or more computational device functions.

Figure 2:
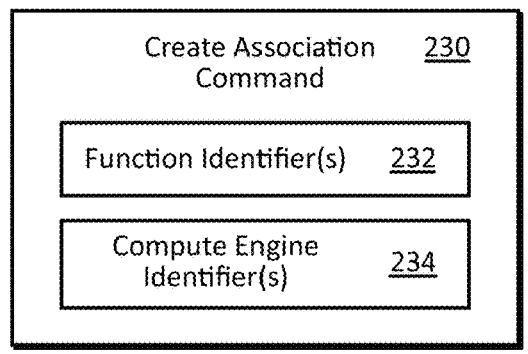
FIG. 2 illustrates an embodiment of a create association command in accordance with example embodiments of the disclosure.

FIG. 2 illustrates an embodiment of a create association command in accordance with example embodiments of the disclosure. The create association command 230 illustrated in FIG. 2, may be used, for example, to create an association between one or more computational device functions and one or more compute engines in the system illustrated in FIG. 1.

Referring to FIG. 2, the create association command 230 may include one or more parameters such as one or more function identifiers 232 and one or more compute engine identifiers 234. Depending on the implementation details, the create association command 230 may create an association between one or more computational device functions identified by the one or more function identifiers 232 and one or more compute engines identified by the one or more compute engine identifiers 234. In some embodiments, if the command 230 executes successfully, the create association command 230 may return a value of an association identifier (which may also be referred to as a function association identifier (FAI)) that identifies the association created by the command 230. If, however, the create association command 230 encounters an error (e.g., an incorrect parameter), the create association command 230 may return a status (e.g., an error code) that may identify the error it encountered.

When used with the embodiment illustrated in FIG. 1, the create association command 230 may be sent from the host 102 (e.g., by an application 128) to a command parser at a computational device (e.g., a command parser implemented at the device controller 105). Depending on the implementation details, the device controller 105 may process the create association command 230 and perform one or more related operations. For example, the device controller 105 may maintain a table or other data structure of the associations that have been created, perform error checking based on the parameters that are passed with the command 230, return a value of an association identifier (e.g., an FAI) that identifies the association created by the command 230, and/or the like.

Figure 3:
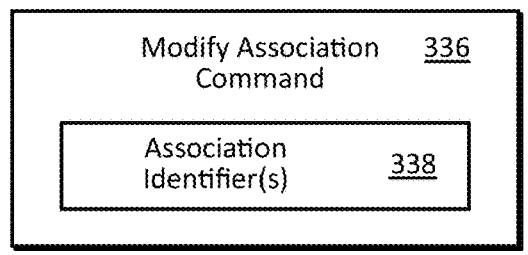
FIG. 3 illustrates an embodiment of a modify association command in accordance with example embodiments of the disclosure.

FIG. 3 illustrates an embodiment of a modify association command in accordance with example embodiments of the disclosure. The modify association command 336 illustrated in FIG. 3, may be used, for example, to modify an association (which may have been created, for example, by the create association command 230 illustrated in FIG. 2) between a computational device function and one or more compute engines in the system illustrated in FIG. 1.

Referring to FIG. 3, the modify association command 336 may include one or more parameters such as one or more association identifiers 338 (e.g., one or more FAIs). Depending on the implementation details, the modify association command 336 may modify an association identified by the one or more association identifiers 338. For example, in some embodiments, the modify association command 336 may delete an association identified by the one or more association identifiers 338.

When used with the embodiment illustrated in FIG. 1, the modify association command 336 may be sent from the host 102 (e.g., by an application 128) to a command parser at a computational device (e.g., a command parser implemented at the device controller 105). Depending on the implementation details, the device controller 105 may process the modify association command 336 and perform one or more related operations. For example, the device controller 105 may modify a table or other data structure of the associations that have been created, for example, by the create association command 230, perform error checking based on the parameters that are passed with the modify association command 336, return a status value that may indicate a successful execution of the command or identify an error (e.g., an incorrect parameter) encountered by the modify association command 336, and/or the like.

Figure 4:
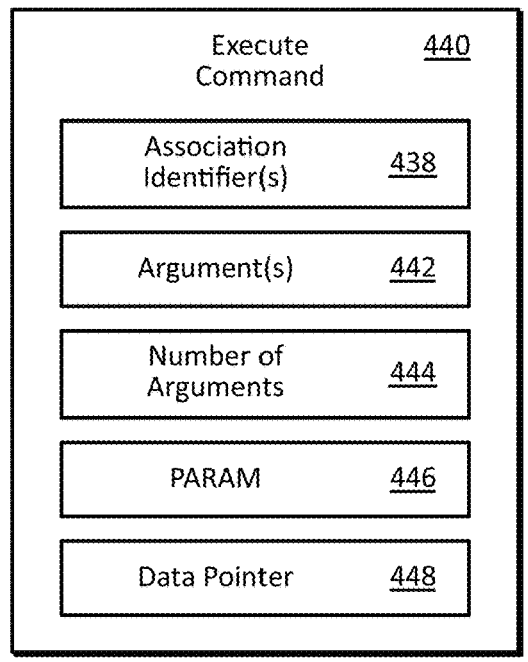
FIG. 4 illustrates an embodiment of an execute command in accordance with example embodiments of the disclosure.

FIG. 4 illustrates an embodiment of an execute command in accordance with example embodiments of the disclosure. The execute command 440 illustrated in FIG. 4, may be used, for example, to execute one or more computational device functions using one or more compute engines that may have been associated with the one or more computational device functions, for example, by the create association command 230 illustrated in FIG. 2.

Referring to FIG. 4, the execute command 440 may include one or more parameters such as one or more association identifiers 438 (e.g., one or more FAIs) that may identify one or more computational device functions to be executed and one or more compute engines on which the one or more computational device functions are to be executed. The execute command 440 may include one or more additional parameters such as one or more arguments 442 that may be passed to the one or more compute engines, a number 444 of the arguments 442 passed to the one or more compute engines, one or more data pointers 448 that may specify the location of input and/or output data for the identify one or more computational device functions and/or one or more generic parameters 446 that may be used by the execute command 440.

Depending on the implementation details, the execute command 440 may invoke (e.g., start, initiate, launch, and/or the like) the execution of the one or more computational device functions using the one or more compute engines specified by the one or more association identifiers 438. As part of invoking the execution process, one or more of the arguments 442 and/or generic parameters 446 may be passed to the one or more compute engines. The one or more compute engines identified by the one or more association identifiers 438 may then execute the one or more computational device functions identified by the one or more association identifiers 438 using, for example, input data pointed to by the one or more data pointers 448.

In some embodiments, if the one or more compute engines successfully execute the one or more computational device functions, the one or more compute engines may place output data in a location pointed to by one or more of the data pointers 448, and the execute command 440 may return a status indicating successful completion of the one or more computational device functions. If, however, one or more errors are encountered during the execution of the one or more computational device functions, or if the execute command 440 encounters is passed an incorrect parameter, the execute command 440 may return one or more status values (e.g., error codes) that may identify the error it encountered.

When used with the embodiment illustrated in FIG. 1, the execute command 440 may be sent from the host 102 (e.g., by an application 128) to a command parser at a computational device (e.g., a command parser implemented at the device controller 105). Depending on the implementation details, the device controller 105 may process the execute command 440 and perform one or more related operations. For example, the device controller 105 may invoke (e.g., start, initiate, launch, and/or the like) the execution of the one or more computational device functions using the one or more compute engines specified by the one or more association identifiers 438, perform error checking based on the parameters that are passed with the execute command 440, return a status value that may indicate a successful execution of the command or identify an error (e.g., an incorrect parameter) encountered by the execute command 440, and/or the like.

FIG. 5 illustrates another embodiment of a create association command in accordance with example embodiments of the disclosure. The create association command 530 illustrated in FIG. 5, illustrates some possible implementation details that may be used, for example, to implement the create association command 230 illustrated in FIG. 2. The create association command 530 may be used, for example, to create an association between a computational device function and one or more compute engines in the system illustrated in FIG. 1. For purposes of illustration, the command 530 may be illustrated in the context of an NVMe command, but the inventive principles are not limited to use with NVMe or any other protocol or any of the implementation details (e.g., command format, byte numbers, bit numbers, and/or the like) illustrated in FIG. 5. The create association command 530 may be used, for example, to associate a relatively small number of compute engines (e.g., 12 or fewer compute engines) with a computational device function.

Referring to FIG. 5, the create association command 530 may include sixteen command double words (CDWx), where x may be any number from 0 to 15. Each command double word CDWx may include 32 bits identified (from left to right) as bits 31 through 00 as indicated at the top of FIG. 5. In some embodiments, the command double words CDWx may also be divided into 8-bit bytes. For example, CDW0 may include (from left to right) bytes 03-00, CDW1 may include bytes 07-04, and so forth for a total of 64 bytes (identified as bytes 63-0). In some embodiments, command double words may also be referred to as Command Dwords or command dwords.

Table 1 illustrates embodiments of Command Dwords that may be used with the create association command 530 illustrated in FIG. 5 in accordance with example embodiments of the disclosure.

TABLE 1

Create Association Command
(Number of Compute Engines ≤ 12)

| | Bytes | Bits | Description |
|---|---|---|---|
| CDW0 | 03:00 | 07:00 | Opcode (OPC) |
| | | 09:08 | Fused Operation (FUSE) |
| | | 13:10 | Reserved |
| | | 15:14 | PRP or SGL for Data Transfer (PSDT) |
| | | 31:16 | Command Identifier (CID) |
| CDW1 | 07:04 | | Namespace Identifier (NSID) |
| CDW2 | 11:08 | 31:16 | Number Of Compute Engines (NOCE) |
| | | 15:00 | Function Slot (FS) |
| CDW3 | 15:12 | | (Not Used) |
| CDW4 | 19:16 | | (Not Used) |
| CDW5 | 23:20 | | (Not Used) |

TABLE 1-continued

Create Association Command
(Number of Compute Engines ≤ 12)

| | Bytes | Bits | Description |
|---|---|---|---|
| CDW6 | 27:24 | | (Not Used) |
| CDW7 | 31:28 | | (Not Used) |
| CDW8 | 35:32 | | (Not Used) |
| CDW9 | 39:36 | | (Not Used) |
| CDW10 | 43:40 | 192:00 | Compute Engine ID List (CEIDL) |
| CDW11 | 47:44 | | |
| CDW12 | 51:48 | | |
| CDW13 | 55:52 | | |
| CDW14 | 59:56 | | |
| CDW15 | 63:60 | | |

Referring to FIG. 5 and Table 1, CDW0 may include one or more of the following fields: Opcode (OPC), Fused Operation (FUSE), PRP or SGL for Data Transfer (PSDT) (where PRP may refer to Physical Region Page and SGL may refer to Scatter/Gather List), and/or Command Identifier (CID). In some embodiments, the fields included in CDW0 may be implemented as standard fields.

CDW1 may be used for a Namespace Identifier (NSID). In some embodiments, (e.g., in an NVMe storage device) a namespace may refer to a memory or storage area (e.g., a collection of logical block addresses (LBAs) that may appear as a separate (e.g., logical) storage device to a host and/or an application.

CDW2 may be used to identify a computational device function and one or more compute engines that are to be associated. In some embodiments, this information may be implemented as follows.

Number Of Compute Engines (NOCE): this field may occupy bits 31:16 of CDW2 and may specify the number of compute engines that are associated with the function slot (FS) field. If the number of compute engines is less than or equal to a predetermined value (e.g., 12), the compute engines may be identified in a list of compute engine identifiers (CEIDs) located at CDW10 through CDW15 as described below. However, if the number of compute engines exceeds the predetermined value (e.g., 12), a different version of the create association command 530 may be used as described below with respect to FIG. 6. In some embodiments, the NOCE field may not exceed the value specified in a compute engine (CE) log page.

Function Slot (FS): this field may occupy bits 15:00 of CDW2 and may specify a function slot for a computational device function that may be associated with one or more compute engines. If the value of FS is non-zero with a valid program slot, the create association command 530 (processed, for example, by the device controller 105) may associate the function located at this function slot with one or more compute engines identified by one or more CEIDs located at CDW10 through CDW15 as described below. If, however, the function slot is zero or invalid, create association command 530 may fail and return a status value that may indicate that invalid program slot was passed with the command 530.

Compute Engine Identifier List (CEIDL): this field may occupy some or all of CDW10 through CDW15 and may include a list of one or more CEIDs that may identify one or more compute engines that are to be associated with the function at the function slot indicated by FS. (The number of compute engines listed in CEIDL may be indicated by NOCE.) In the example illustrated in FIG. 5 and Table 1, each CEID may be 16 bits long, and thus, 12 CEIDs may occupy up to 192 bits at CDW10 through CDW15, but any other CEID size and/or number of CDWs may be used.

In some embodiments, the create association command 530 may be implemented as an administrative command, for example, in an NVMe implementation. Depending on the implementation details, the create association command 530 may be submitted (e.g., to a submission queue (SQ)) while one or more other commands in an administrative submission queue, an input and/or output (I/O or IO) submission queue, and/or the like may be outstanding. In some embodiments, the create association command 530 may only allow a function association with one or more compute engines for valid compute engines, for example, as may be defined in a compute engine log page.

Upon completion of the create association command 530, a completion queue (CQ) entry indicating the status of the command may be posted (e.g., by a controller such as controller 105 illustrated in FIG. 1). In some embodiments, the completion queue entry may include an association identifier (e.g., an FAI), for example, in CDW0 of the completion queue entry. The association identifier may be used, for example, by a modify association command, a delete association command, an execute command, and/or the like. Table 2 illustrates some example embodiments of command completion status values that may indicate command-specific errors if the create association command 530 is not successful.

TABLE 2

Create Association Command Status Values

| Value | Description |
|---|---|
| 06h | Invalid Function Slot: The create association operation failed as the specified function slot may be invalid and/or not available. |
| 07h | Invalid Compute Engine Count: The computational device may not support the specified number of compute engines for association. |
| 0Bh | Invalid Compute Engine Specified: One or more compute engines specified may not be defined and/or available in the computational device. |

FIG. 6 illustrates another embodiment of a create association command in accordance with example embodiments of the disclosure. In some aspects, the create association command 630 illustrated in FIG. 6, may be similar to the create association command 530 illustrated in FIG. 5, however, the command 630 illustrated in FIG. 6 may be used, for example, to associate a relatively large number of compute engines (e.g., more than 12 compute engines) with a computational device function. For purposes of illustration, the command 630 may be illustrated in the context of an NVMe command, but the inventive principles are not limited to use with NVMe or any other protocol or any of the implementation details (e.g., command format, byte numbers, bit numbers, and/or the like) illustrated in FIG. 6.

Table 3 illustrates embodiments of Command Dwords that may be used with the create association command 630 illustrated in FIG. 6 in accordance with example embodiments of the disclosure.

Referring to FIG. 6, and Table 3, the create association command 630 may use CDW0, CDW1, and/or CDW2 in a manner similar to command 530 illustrated in FIG. 5. However, when the number of compute engines that are to be associated with a function is greater than a predetermined number (e.g., 12) (e.g., for a value of NOCE in CDW2>12), the create association command 630 illustrated in FIG. 6 may use a data pointer (DPTR) located at CDW6 through CDW9 to point to a data location that may contain a list of compute engine identifiers (CEIDs) that may identify the compute engines that are to be associated with the function. For example, in some embodiments, the data pointer field DPTR may specify a host buffer that may contain a list of CEIDs. The length of the buffer may be determined, for example, by the NOCE field. In this embodiment, CDW10 through CDW15 may be unused.

TABLE 3

Create Association Command
(Number of Compute Engines > 12)

| | Bytes | Bits | Description |
|---|---|---|---|
| CDW0 | 03:00 | 07:00 | Opcode (OPC) |
| | | 09:08 | Fused Operation (FUSE) |
| | | 13:10 | Reserved |
| | | 15:14 | PRP or SGL for Data Transfer (PSDT) |
| | | 31:16 | Command Identifier (CID) |
| CDW1 | 07:04 | | Namespace Identifier (NSID) |
| CDW2 | 11:08 | 31:16 | Number Of Compute Engines (NOCE) |
| | | 15:00 | Function Slot (FS) |
| CDW3 | 15:12 | | (Not Used) |
| CDW4 | 19:16 | | (Not Used) |
| CDW5 | 23:20 | | (Not Used) |
| CDW6 | 27:24 | 127:00 | DPTR |
| CDW7 | 31:28 | | |
| CDW8 | 35:32 | | |
| CDW9 | 39:36 | | |
| CDW10 | 43:40 | | (Not Used) |
| CDW11 | 47:44 | | (Not Used) |
| CDW12 | 51:48 | | (Not Used) |
| CDW13 | 55:52 | | (Not Used) |
| CDW14 | 59:56 | | (Not Used) |
| CDW15 | 63:60 | | (Not Used) |

In some embodiments, completion of the create association command 630 may be implemented in a manner similar to that described above with respect to the create association command 530 illustrated in FIG. 5. For example, in some embodiments, the create association command 630 may be implemented as an administrative command (e.g., in an NVMe implementation). As another example, a completion queue entry may be posted in which an association identifier (e.g., an FAI) for the newly created association, one or more status values may indicate the status of the command (e.g., as illustrated in Table 2), and/or the like.

FIG. 7 illustrates an embodiment of a delete association command in accordance with example embodiments of the disclosure. The delete association command 736 illustrated in FIG. 7, illustrates some possible implementation details that may be used, for example, to implement the modify association command 336 illustrated in FIG. 3. The delete association command 736 may be used, for example, to delete an association between a computational device function and one or more compute engines in the system illustrated in FIG. 1. For purposes of illustration, the command 736 may be illustrated in the context of an NVMe command, but the inventive principles are not limited to use with NVMe or any other protocol or any of the implementation details (e.g., command format, byte numbers, bit numbers, and/or the like) illustrated in FIG. 7.

Table 4 illustrates embodiments of Command Dwords that may be used with the delete association command 736 illustrated in FIG. 7 in accordance with example embodiments of the disclosure.

Referring to FIG. 7, and Table 4, the delete association command 736 may have a structure similar to that of the create association command 530 illustrated in FIG. 5 and may use CDW0, and CDW1 in a similar manner. However, the delete association command 736 may use CDW10 for an association identifier (e.g., an FAI) to identify the association to delete.

TABLE 4

Delete Association Command

| Bytes | Bits | Description |
|---|---|---|
| CDW0 | 03:00 | |
| | 07:00 | Opcode (OPC) |
| | 09:08 | Fused Operation (FUSE) |
| | 13:10 | Reserved |
| | 15:14 | PRP or SGL for Data Transfer (PSDT) |
| | 31:16 | Command Identifier (CID) |
| CDW1 | 07:04 | Namespace Identifier (NSID) |
| CDW2 | 11:08 | (Not Used) |
| CDW3 | 15:12 | (Not Used) |
| CDW4 | 19:16 | (Not Used) |
| CDW5 | 23:20 | (Not Used) |
| CDW6 | 27:24 | (Not Used) |
| CDW7 | 31:28 | (Not Used) |
| CDW8 | 35:32 | (Not Used) |
| CDW9 | 39:36 | (Not Used) |
| CDW10 | 43:40 | |
| | 15:00 | Function Association Identifier (FAI) |
| | 31:16 | Reserved |
| CDW11 | 47:44 | (Not Used) |
| CDW12 | 51:48 | (Not Used) |
| CDW13 | 55:52 | (Not Used) |
| CDW14 | 59:56 | (Not Used) |
| CDW15 | 63:60 | (Not Used) |

In some embodiments, the delete association command 736 may be implemented as an administrative command, for example, in an NVMe implementation. Depending on the implementation details, the delete association command 736 may be submitted (e.g., to a submission queue) while one or more other commands in an administrative submission queue, an fa submission queue, and/or the like may be outstanding.

Upon completion of the delete association command 736, a completion queue entry indicating the status of the command may be posted (e.g., by a controller such as controller 105 illustrated in FIG. 1). Table 5 illustrates some example embodiments of command completion status values that may indicate command-specific errors if the delete association command 736 is not successful.

TABLE 5

Delete Association Command Status Values

| Value | Description |
|---|---|
| 06h | Invalid Function Association Identifier: The delete association operation may have failed as the specified input may be invalid and/or not available. |
| 07h | Function Association Identifier In Use: The specified function association identifier may be currently in use by the computational device and may not be deleted. |

FIG. 8 illustrates an embodiment of an execute function command in accordance with example embodiments of the disclosure. The execute function command 840 illustrated in FIG. 8, illustrates some possible implementation details that may be used, for example, to implement the execute command 440 illustrated in FIG. 4. The execute function command 840 may be used, for example, to execute a computational device function using one or more compute engines as specified by an association identifier (e.g., an FAI) that may have been created, for example, by either of the create association commands 530 and/or 630 described above with respect to FIG. 5 and/or FIG. 6, respectively. For purposes of illustration, the command 840 may be illustrated in the context of an NVMe command, but the inventive principles are not limited to use with NVMe or any other protocol or any of the implementation details (e.g., command format, byte numbers, bit numbers, and/or the like) illustrated in FIG. 8.

Table 6 illustrates embodiments of Command Dwords that may be used with the execute function command 840 illustrated in FIG. 8 in accordance with example embodiments of the disclosure.

Referring to FIG. 8, and Table 6, the execute function command 840 may use CDW0 and/or CDW1 in a manner similar to command 530 illustrated in FIG. 5. However the execute function command 840 may use CDW2 to pass one or more parameters as described below to the computational device function for use during execution using the one or more compute engines.

TABLE 6

Execute Function Command

| Bytes | Bits | Description |
|---|---|---|
| CDW0 | 03:00 | |
| | 07:00 | Opcode (OPC) |
| | 09:08 | Fused Operation (FUSE) |
| | 13:10 | Reserved |
| | 15:14 | PRP or SGL for Data Transfer (PSDT) |
| | 31:16 | Command Identifier (CID) |
| CDW1 | 07:04 | Namespace Identifier (NSID) |
| CDW2 | 11:08 | |
| | 15:00 | Function Association Identifier (FAI) |
| | 23:16 | Number of Function Arguments (NOFA) |
| | 24 | Function Arguments Option (FAO) |
| | 31:25 | Reserved |
| CDW3 | 15:12 | (Not Used) |
| CDW4 | 19:16 | (Not Used) |
| CDW5 | 23:20 | (Not Used) |
| CDW6 | 27:24 | |
| | 127:00 | DPTR |
| CDW7 | 31:28 | |
| CDW8 | 35:32 | |
| CDW9 | 39:36 | |
| CDW10 | 43:40 | |
| | 192:00 | PARAMD |
| CDW11 | 47:44 | |
| CDW12 | 51:48 | |
| CDW13 | 55:52 | |
| CDW14 | 59:56 | |
| CDW15 | 63:60 | |

Referring to FIG. 8 and Table 6, in some embodiments, CDW2 may include one or more of the following fields:

Function Association Identifier (FAI): this field may specify a function association identifier that may be used by the execute function command 840. If the value of FAI is non-zero with a valid FAI field, then the computational device may execute the function with the function parameters provided. If the FAI field is zero or invalid, the computational device may fail the command and return a status of Invalid Function Association Identifier.

Number Of Function Arguments (NOFA): this field may specify a number of arguments provided to the execute function command 840 in a data location pointed to by a data pointer DPTR.

Function Arguments Option (FAO): in some embodiments, if the FAO field is set to '1', it may indicate that the execute function command 840 may use one or more function arguments located in the PARAMD field (and the DPTR field may be ignored). If the FAO field is set to '0', it may indicate that the execute function command 840 may use one or more arguments pointed to by the data pointer DPTR field (and the PARAMD field may be ignored).

Upon completion of the execute function command 840, a completion queue entry indicating the status of the command may be posted (e.g., by a controller such as controller 105 illustrated in FIG. 1). Moreover, output data from the function execution may be provided, for example, at one or more locations pointed to by the data pointer DPTR field.

In some embodiments, and depending on the implementation details, one or more of the features (e.g., the fields FAI, NOFA, FOA, and/or the like) may prevent a user (e.g., an application, a host, and/or the like) from making a such as not associating a function with one or more compute engines. In some embodiments, the execute function command 840 may perform one or more error checks on one or more of the fields FAI, NOFA, FOA, and/or the like and report errors, for example, by passing a status value in the completion queue entry.

In some embodiments, an association scheme may implement a discovery feature that may enable a computational device to advertise one or more compute engines, capabilities, and/or the like. For example, Table 7 illustrates example embodiments of a data structure that a computational device may return in response to a request command (e.g., an NVMe GetLog command).

TABLE 7

| Computational Device Compute Engine List | |
|---|---|
| Bytes | Description |
| 01:00 | Number of Compute Engines in List |
| 4096:02 | Array of Compute Engines in sequential order where each compute engine is represented by an identifier (e.g., of 16-bits) |

In some embodiments, and depending on the implementation details, an association scheme in accordance with example embodiments of the disclosure may provide a simplified technique for namespace management. For example, in some embodiments without an association scheme as described herein, a process for preparing and executing a function using a compute engine may involve the following operations: (1) a namespace is created with a specific compute engine; (2) a function may be activated on the specific compute engine; and (3) the function may be invoked by specifying the namespace (e.g., with the compute engine implied) and the function (e.g., by specifying a function slot). However, in some embodiments that may implement an association scheme in accordance with example embodiments of the disclosure, a process for preparing and executing a function using a compute engine may involve one or more of the following operations: (1) a namespace may be created with the association of a function and one or more compute engines (in some embodiments, this may be characterized as an implicit activation of the function); and (2) the function may be invoked by specifying the namespace (e.g., with the compute engine and the function implied).

Any of the functionality disclosed herein, including, for example, the device controller 105, or any of the functionality implemented at a host, a computational device, and/or the like, may be implemented with hardware, software, firmware, or any combination thereof including combinational logic, sequential logic, one or more timers, counters, registers, and/or state machines, one or more complex programmable logic devices CPLDs, FPGAs, ASICs, CPUs, GPUs, NPUs, TPUs, and/or the like, executing instructions stored in any type of memory, or any combination thereof. In some embodiments, one or more components may be implemented as a system-on-chip (SOC).

Figure 9:
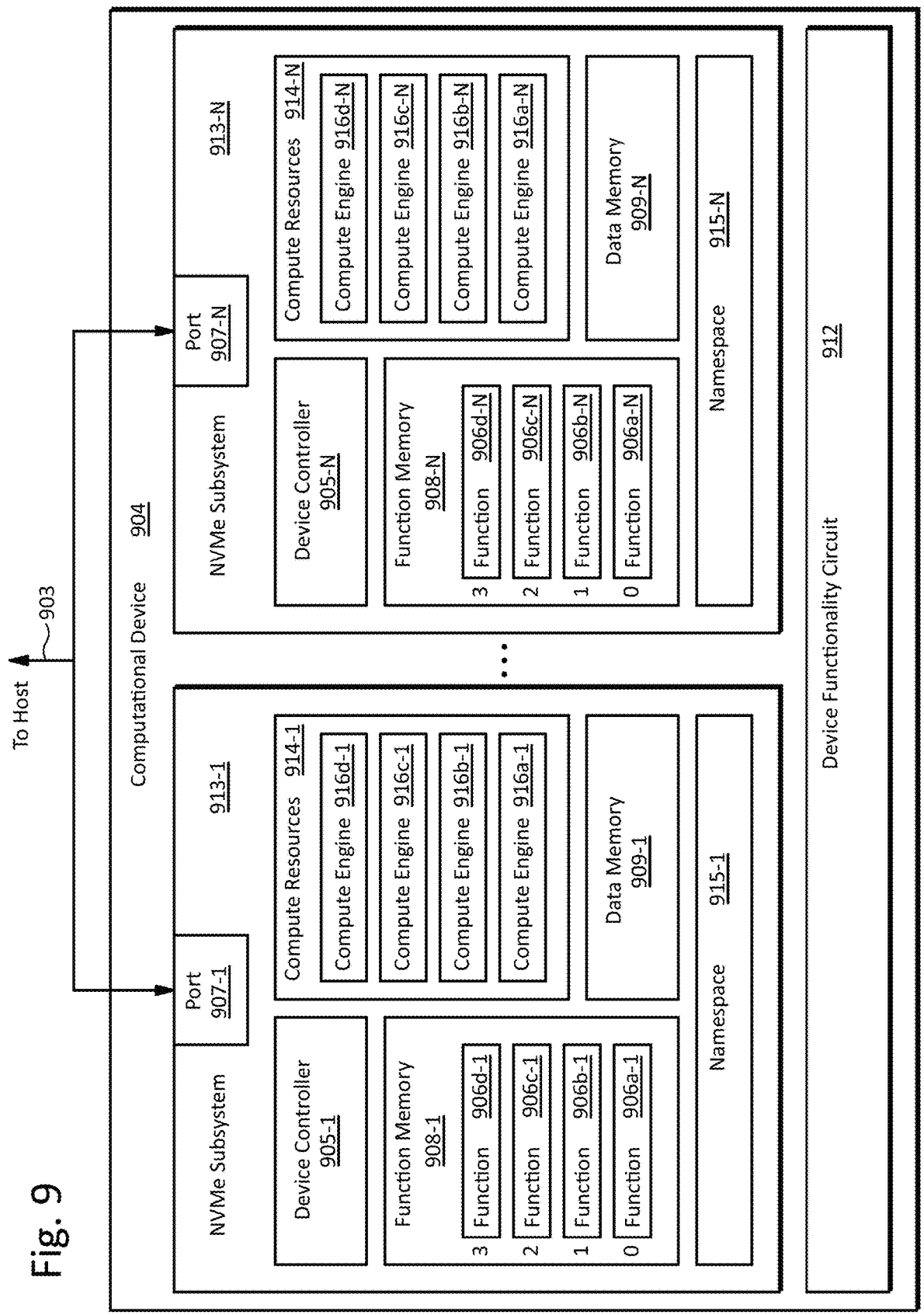
FIG. 9 illustrates an embodiment of a scheme having one or more subsystems for implementing one or more computational device functions with one or more compute engines at a computational device in accordance with example embodiments of the disclosure.

FIG. 9 illustrates an embodiment of a computational device having one or more subsystems for implementing one or more computational device functions with one or more compute engines in accordance with example embodiments of the disclosure. The computational device 904 illustrated in FIG. 9 may include one or more NVMe subsystems 913-1, . . . , 913-N. Each of the one or more NVMe subsystems 913-1, . . . , 913-N may include a corresponding device controller 905-1, . . . , 905-N, function memory 908-1, . . . , 908-N, compute resources 914-1, . . . , 914-N, and/or data memory 909-1, . . . , 909-N. The function memories 908-1, . . . , 908-N may each include any number of function slots that may be used to store computational device functions (e.g., computational device functions 906*a*-1, 906*b*-1, 906*c*-1, and/or 906*d*-1 in function memory 908-1). The compute resources 914-1, . . . , 914-N may each include any number of compute engines (e.g., compute engines 916*a*-1, 916*b*-1, 916*c*-1, and/or 916*d*-1 in compute resources 914-1).

Each of the one or more NVMe subsystems 913-1, . . . 913-N may further include one or more corresponding network ports 907-1, . . . , 907-N that may connect a corresponding one of the NVMe subsystems 913-1, . . . 913-N to one or more hosts, for example, through one or more network connections 903. In some embodiments, one or more of the NVMe subsystems 913-1, . . . , 913-N may share one or more network ports. In some embodiments, one or more of the NVMe subsystems 913-1, . . . , 913-N may have more than one network port.

Each of the one or more NVMe subsystems 913-1, . . . , 913-N may further include one or more corresponding namespaces 915-1, . . . , 915-N, which may be implemented, for example, as storage namespaces.

In some embodiments, one or more of the components in each of the one or more NVMe subsystems 913-1, . . . , 913-N may operate in a manner similar to the corresponding components in the computational device 104 illustrated in FIG. 1. However, in some embodiments, the components in each of the one or more NVMe subsystems 913-1, . . . , 913-N may use a corresponding namespace 915-1, . . . , 915-N. Thus, in some embodiments, one or more of the compute resources may be arranged in, and/or accessed as, an association based on a namespace (e.g., by one or more hosts). In some embodiments, such an association may be referred to as a domain.

For purposes of illustration, the embodiment illustrated in FIG. 9 may be described in the context of NVMe subsystems, but the inventive principles may be implemented with any type of subsystem used with any type of interface, protocol, and/or the like.

Figure 10:
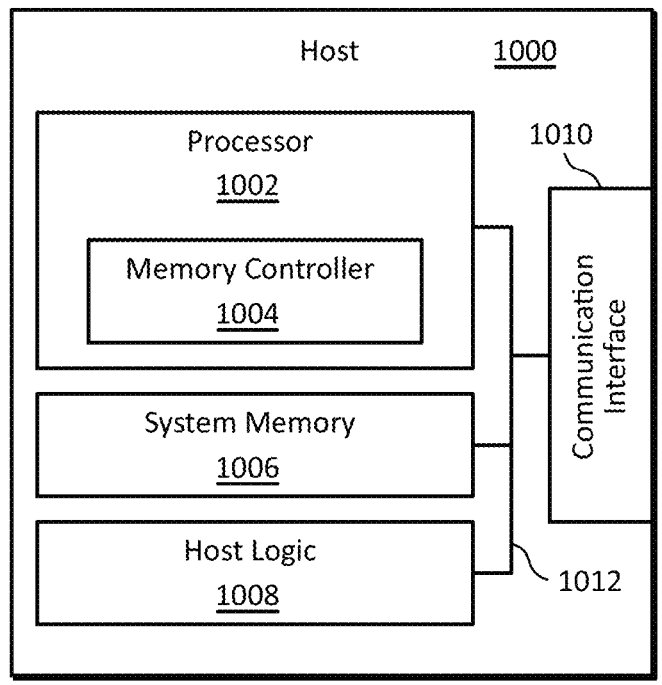
FIG. 10 illustrates an example embodiment of a host apparatus in accordance with example embodiments of the disclosure.

FIG. 10 illustrates an example embodiment of a host apparatus in accordance with example embodiments of the disclosure. The host apparatus illustrated in FIG. 10 may be used, for example, to implement any of the hosts disclosed herein. The host apparatus 1000 illustrated in FIG. 10 may include a processor 1002, which may include a memory controller 1004, a system memory 1006, host logic 1008, and/or a communication interface 1010. Any or all of the components illustrated in FIG. 10 may communicate through one or more system buses 1012. In some embodiments, one or more of the components illustrated in FIG. 10 may be implemented using other components. For example, in some embodiments, the host control logic 1008 may be implemented by the processor 1002 executing instructions stored in the system memory 1006 or other memory. In some embodiments, the host logic 1008 may implement any of the host functionality disclosed herein including, for example, running an application, sending commands to, and/or receiving responses from, a computational device, and availing the host 1000 and/or an application running thereon, of an association scheme as disclosed herein.

Figure 11:
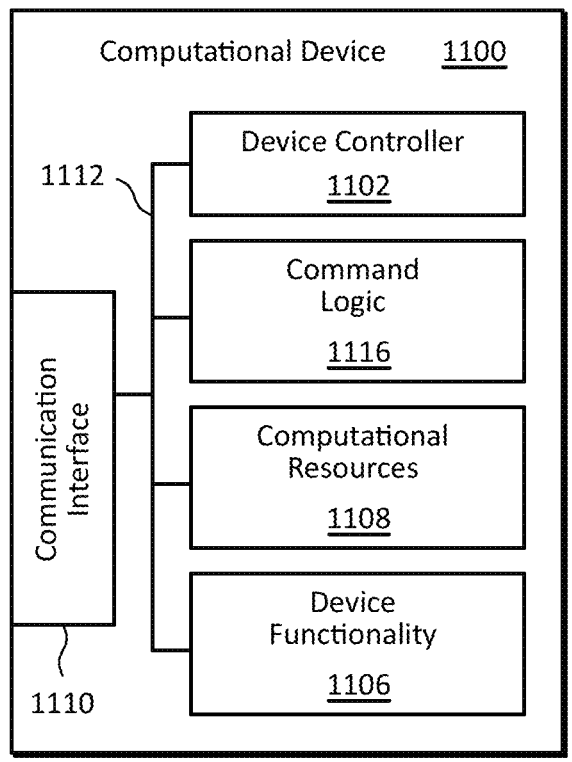
FIG. 11 illustrates an example embodiment of a computational device that may be used to provide a user with access to one or more computational resources through a programming interface in accordance with example embodiments of the disclosure.

FIG. 11 illustrates an example embodiment of a computational device that may be used to provide a user with access to one or more computational resources through a programming interface in accordance with example embodiments of the disclosure. The embodiment 1100 illustrated in FIG. 11 may be used, for example, to implement any of the computational devices disclosed herein. The computational device 1100 may include a device controller 1102, one or more computational resources 1108, command logic 1116 (e.g., to parse one or more commands and/or return one or more responses), a device functionality circuit 1106, and a communication interface 1110. The components illustrated in FIG. 11 may communicate through one or more device buses 1112. In some embodiments, the device controller 1102 and/or one or more computational resources 1108 may include all or a portion of the data memory 109 illustrated in FIG. 1.

The device functionality circuit 1006 may include any hardware to implement the primary function of the device 1000. For example, if the device 1000 is implemented as a storage device, the device functionality circuit 1006 may include a storage medium such as one or more flash memory devices, an FTL, and/or the like. As another example, if the device 1000 is implemented as a network interface card (NIC), the device functionality circuit 1006 may include one or more modems, network interfaces, physical layers (PHYs), medium access control layers (MACs), and/or the like. As a further example, if the device 1000 is implemented as an accelerator, the device functionality circuit 1006 may include one or more accelerator circuits, memory circuits, and/or the like. In some embodiments, the device functionality circuit 1006 may include all or a portion of the data memory 109 illustrated in FIG. 1.

Figure 12:
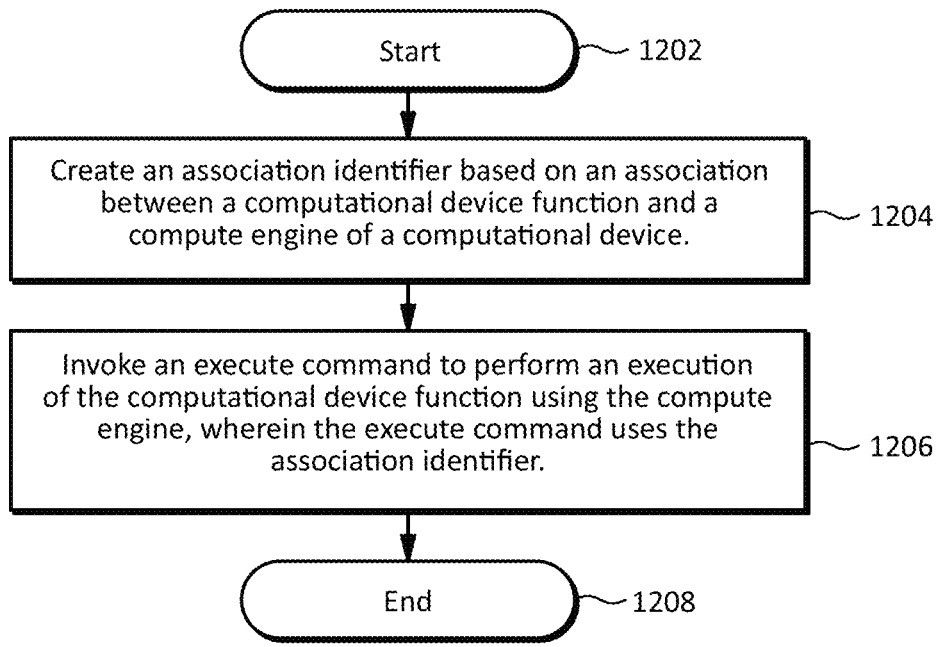
FIG. 12 illustrates an embodiment of a method for implementing an association scheme for one or more computational device functions and one or more compute engines in accordance with example embodiments of the disclosure.

FIG. 12 illustrates an embodiment of a method for implementing an association scheme for one or more computational device functions and one or more compute engines in accordance with example embodiments of the disclosure. The method may begin at operation 1202. At operation 1204, the method may create an association identifier based on an association between a computational device function and a compute engine of a computational device. For example, an application may call a create association command that may create an association based on a function identifier and a compute engine identifier and return the association identifier. At operation 1206, the method may invoke an execute command to perform an execution of the computational device function using the compute engine, wherein the execute command may use the association identifier. For example, a command parser (e.g., running on a device controller at the computational device) may invoke the compute engine identified by the association identifier to run the function identified by the association identifier. The method may end at operation 1208.

Figure 13:
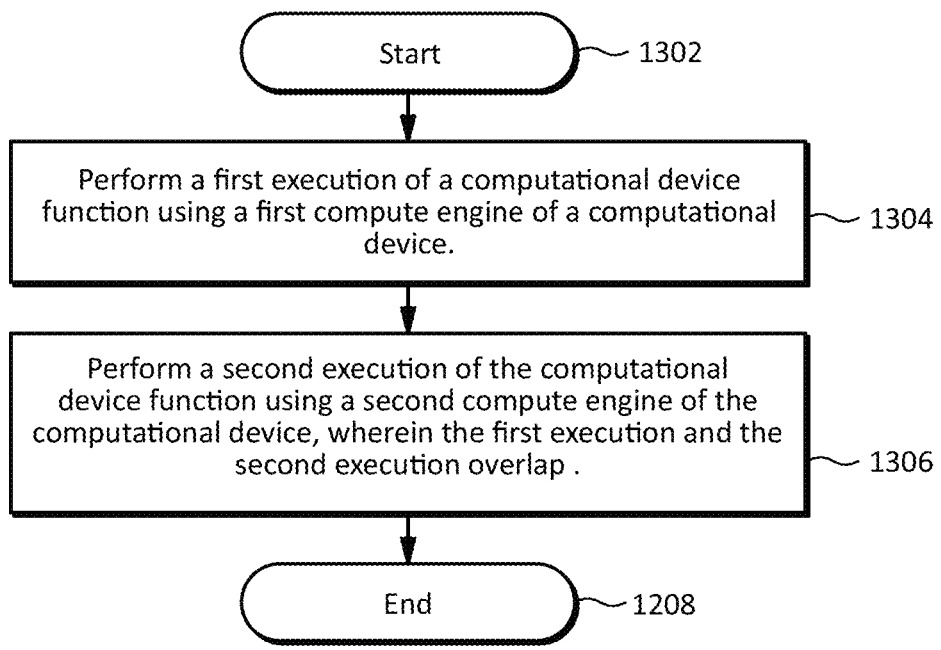
FIG. 13 illustrates an embodiment of a method for executing a computational device function using two compute engines in accordance with example embodiments of the disclosure.

FIG. 13 illustrates an embodiment of a method for executing a computational device function using two compute engines in accordance with example embodiments of the disclosure. The method may begin at operation 1302. At operation 1304, the method may perform a first execution of a computational device function using a first compute engine of a computational device. For example, the first execution may include executing a first thread of the function. At operation 1306, the method may perform a second execution of the computational device function using a second compute engine of the computational device. For example, the second execution may include executing a second thread of the function. In some embodiments, the first execution and the second execution overlap (e.g., the first and second threads may be executed simultaneously by the first and second compute engines, respectively). The method may end at operation 1308.

The embodiments illustrated in FIG. 12 and FIG. 13, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A device comprising:
   a compute resource; and
   at least one control circuit configured to:
      receive a first identifier, wherein the first identifier identifies a computational device function;

receive a second identifier, wherein the second identifier identifies the compute resource;

receive a third identifier, wherein the third identifier identifies an association between the compute resource and the computational device function; and perform, based on the third identifier, using the compute resource, the computational device function.

2. The device of claim 1, wherein the compute resource is a first compute resource, the device comprises a second compute resource, and the third identifier identifies an association between the computational device function and the second compute resource.

3. The device of claim 1, wherein the compute resource is a first compute resource, the device comprises a second compute resource, and the at least one control circuit is configured to perform, based on the third identifier, using the second compute resource, the computational device function.

4. The device of claim 1, wherein the at least one control circuit is configured to:

receive a command that identifies the third identifier; and perform, based on the command, the computational device function.

5. The device of claim 1, wherein the at least one control circuit is configured to send information about the compute resource.

6. The device of claim 1, wherein the at least one control circuit is configured to send information about the computational device function.

7. The device of claim 1, wherein the device comprises a memory configured to store the computational device function.

8. A device comprising:

a compute resource; and at least one control circuit configured to perform one or more operations comprising:

receiving a first identifier, wherein the first identifier identifies a computational device function;

receiving a second identifier, wherein the second identifier identifies the compute resource;

receiving a command, wherein the command identifies the compute resource and the computational device function;

creating, based on the command, an association between the compute resource and the computational device function; and sending, based on the creating, a third identifier, wherein the third identifier identifies the association between the compute resource and the computational device function.

9. The device of claim 8, wherein the creating the association comprises creating the third identifier.

10. The device of claim 8, wherein the one or more operations comprises performing, based on the association, using the compute resource, the computational device function.

11. The device of claim 8, wherein the command is a first command and the one or more operations comprises:

receiving a second command; and performing, based on the second command, using the compute resource, the computational device function.

12. The device of claim 8, wherein the command is a first command and the one or more operations comprises:

receiving a second command; and modifying, based on the second command, the association.

13. The device of claim 8, wherein the one or more operations comprises sending information about the compute resource.

14. The device of claim 8, wherein the one or more operations comprises sending information about the computational device function.

15. The device of claim 8, wherein the device comprises a memory configured to store the computational device function.

16. A device comprising:

a first compute resource;

a second compute resource; and at least one control circuit configured to perform one or more operations comprising:

receiving a first identifier, wherein the first identifier identifies a computational device function;

receiving a second identifier, wherein the second identifier identifies the first compute resource;

receiving a third identifier, wherein the third identifier identifies an association between the first compute resource and the computational device function; and performing, based on the third identifier, using the first compute resource and the second compute resource, the computational device function.

17. The device of claim 16, wherein the performing the computational device function comprises:

performing, using the first compute resource, a first portion of the computational device function; and performing, using the second compute resource, a second portion of the computational device function.

18. The device of claim 17, wherein:

the performing the first portion of the computational device function comprises performing a first thread of the computational device function; and the performing the second portion of the computational device function comprises performing a second thread of the computational device function.

19. The device of claim 16, wherein the third identifier identifies the second compute resource.

* * * * *